United States Patent [19]
Iida et al.

[11] Patent Number: 5,706,083
[45] Date of Patent: Jan. 6, 1998

[54] SPECTROPHOTOMETER AND ITS APPLICATION TO A COLORIMETER

[75] Inventors: Atsuhiro Iida, Nagaokakyo; Kazumi Yokota, Neyagawa; Eiji Ikeda, Nagaokakyo, all of Japan

[73] Assignee: Shimadzu Corporation, Kyoto, Japan

[21] Appl. No.: 769,264

[22] Filed: Dec. 18, 1996

[30] Foreign Application Priority Data

Dec. 21, 1995 [JP] Japan .................. H7-350321
Dec. 21, 1995 [JP] Japan .................. H7-350322

[51] Int. Cl.[6] .................. G01J 3/28; G01J 3/50
[52] U.S. Cl. .................. 356/328; 356/402
[58] Field of Search .................. 356/319, 326, 356/328, 402; 364/498, 526

[56] References Cited

U.S. PATENT DOCUMENTS 4,844,617  7/1989  Kelderman et al. .................. 356/328

FOREIGN PATENT DOCUMENTS 4-106431  4/1992  Japan .
WO91/05360  4/1991  WIPO .................. 356/326

*Primary Examiner*—F. L. Evans
*Attorney, Agent, or Firm*—Oliff & Berridge

[57] ABSTRACT

A spectrophotometer for measuring a two-dimensional area or a spot area in a rather broad surface of a sample, where the spectrophotometer is provided with a camera for taking the picture of the sample surface. The picture is shown on a display screen, and the operator can move a window superimposed on the sample picture in the display screen by using a mouse or the like to a desired place on the sample surface. The sample stage on which the sample is mounted moves according to the movement of the mouse, whereby a spectrophotometric measurement of the desired place (two-dimensional area or the spot area) on the sample is facilitated.

12 Claims, 6 Drawing Sheets

SPECTROPHOTOMETER AND ITS APPLICATION TO A COLORIMETER

The present invention relates to a spectrophotometer that measures a two-dimensional area or a spot area in a rather broad sample surface. Such a spectrophotometer is used in an area analyzer, in a colorimeter, etc.

BACKGROUND OF THE INVENTION

A colorimeter using a two-dimensional spectrophotometer is illustrated in FIG. 9. Light emitted from a lamp 11 is reflected by the surface of a sample 2 placed on a sample stage 1, and passes through a slit 12 extending in the Y-direction. The light passing through the slit 12, which corresponds to a linear portion extending in the Y-direction on the sample surface, is collimated by a lens 13 and is separated with respect to the wavelength by a diffraction grating 14. The separated light passes through a harmonics-eliminating filter 15 and is cast on a photo-detector 17 by a lens 16. The photo-detector 17 is composed of two-dimensionally-arrayed tiny photo-sensors, where one dimension in the Y-direction corresponds to the linear portion of the sample surface and the other dimension in the λ-direction corresponds to wavelength of the separated light coming from every elementary area of the linear portion. That is, a spectral image representing the collection of the spectra of the linear portion of the sample 2 is cast on the photo-detector 17.

While an optical system 10 including the lamp 11, diffraction grating 14 and photo-detector 17 is moved by a motor (not shown) intermittently in the X-direction, which is perpendicular to the linear portion in the Y-direction, the spectral images of the linear portions are respectively obtained. Instead of moving the optical system 10, the sample stage 1 may be moved in the X-direction. When a preset distance is moved, spectra of the elementary areas constituting the two-dimensional area swept by the linear portion on the sample surface are obtained. The photo-intensity data constituting the spectra of the two-dimensional area is processed in a personal computer 20 to determine the color of every elementary area. The results of the data processing are shown on the screen of a display device 21 or given out from a printer 22.

Such a two-dimensional colorimeter or spectrophotometer is useful in measuring a color distribution of a two-dimensional area or in performing a two-dimensional chemical analysis. It should be noted, however, that the operator must determine first the area in which a measurement is performed. In a conventional colorimeter or spectrophotometer, the operator moves the sample stage or the optical system while looking carefully at the sample and the optical system together. When the measurement area is small compared to the whole area of the sample, or when an exact placing of the measurement area is required, such an area setting is tedious and troublesome for the operator.

SUMMARY OF THE INVENTION

An object of the present invention is therefore to provide a spectrophotometer or a colorimeter in which placing of a measurement area is greatly facilitated.

Further object of the present invention is to provide an advanced form of the above spectrophotometer or a colorimeter in which a preparatory measurement can be made to facilitate the proper measurement or to improve the efficiency of the overall measurement.

Thus the first type of spectrophotometer according to the present invention includes:

a light source for casting a light on a sample;

a spectral element for separating the light coming from a linear portion of the sample with respect to wavelength;

a photo-detector including a plurality of elementary photo-sensors arrayed two-dimensionally for measuring the light separated by the spectral element;

a first controller for controlling a relative movement of a sample stage on which the sample is mounted and an optical system including the spectral element and the photo-detector in order to perform a spectrophotometry;

a camera for taking a picture of the sample;

a display device for showing the picture of the sample;

an input device, such as a mouse, track ball, digitizer, slide pad, keyboard, etc., used by an operator looking at the picture for designating a place on the sample; and a second controller for controlling a relative movement of a sample stage and the optical system in order to bring the designated place at the optical system.

The spectrophotometer may further include:

a window generator for generating an image of a window at the designated place; and a superimposer for superimposing the image of the window on the picture of the sample.

A second type of spectrophotometer according to the present invention includes:

a light source for casting a light on a sample;

a spectral element for separating the light coming from the sample with respect to wavelength;

a photo-detector for measuring the light separated by the spectral element;

a camera for taking a picture of the sample;

a display device for showing the picture of the sample;

an input device used by an operator looking at the picture for designating a place on the sample; and a controller for controlling a relative movement of a sample stage and the optical system in order to bring the designated place at the optical system.

The spectrophotometer of this type may further include:

a pointer generator for generating an image of a pointer at the designated place; and a superimposer for superimposing the image of the pointer on the picture of the sample.

The function of the pointer is just the same as the window in the above spectrophotometer.

In the spectrophotometer of the first and second types of the present invention, the operator can designate or set a desired measurement area or measurement spot looking at the picture of the sample surface on the display device. The window or pointer superimposed on the picture clearly identify the measurement area or spot. When the operator operates the input device, the window or pointer moves, or the picture moves instead while the window or pointer is fixed, according to the operation of the input device. The second controller in the first type or the controller in the second type moves the sample stage or the optical system according to the movement of the window or the pointer. Thus, when the operator finally determines or designates a place to measure, the designated place is at the optical system, whereas the spectrophotometry is automatically performed on the designated area or spot. Instead of moving the sample stage or the optical system real-time with the movement of the window or the pointer, the second controller in the first type or the controller in the second type may move them after the measurement area is finally determined.

The third type of the present invention is an application to a colorimeter which is used for measuring a color or colors of a sample mounted on a sample stage by performing a spectrophotometry of the sample using an optical system. The colorimeter includes:

- a camera for taking a color picture of the sample, the picture consisting of two-dimensionally arrayed pixels;
- a data storage for storing color data of the pixels with an information about a place of each of the pixels;
- determining means for determining a place and/or a size of a measurement area of the sample based on the color data of the pixels with the information about the place referring to a preset rule;
- moving means for moving the sample stage and/or the optical system; and
- a controller for controlling a relative movement of the sample stage and the optical system so that the spectrophotometry is performed on the measurement area.

The colorimeter may further include:

- a pointer generator for generating an image of a pointer at the designated place; and
- a superimposer for superimposing the image of the pointer on the picture of the sample.

In the above colorimeter, the camera takes a color picture of the sample before a proper color measurement using a spectrophotometry is performed. The color data of the picture is stored in a data storage. The color data may, for example, be separated into red (R), green (G) and blue (B) primary colors, or may be separated otherwise so long as the separation can discriminate different colors of the sample surface. The color data is stored with the information about the place of each pixel. Using the color data with the information about the place, various preparatory measures can be taken, one of which is to automatically determine the place and/or the size of a measurement area suited for the object of the color measurement.

When, for example, a precise color comparison between two or more areas having the same or similar colors on a sample is required, the determining means read out the color data of the pixels with the information about the place from the data storage, and determine areas of the same or similar colors. Then, referring to a preset rule, the determining means determine the places and/or the sizes of measurement areas on the sample. After the measurement areas are determined, the controller moves the sample or the optical system to bring the measurement areas to the optical system one by one, whereby color measurements by spectrophotometry are automatically performed. When the size of the measurement areas, as well as the places, are determined, the controller changes the distance between the sample and the optical system. If a zoom lens is used, the distance need not be changed but the focal length of the zoom lens is changed to adjust the size of the measurement area.

The colorimeter of the present invention greatly improves the efficiency of color measurements, and decreases the processing time.

DETAILED DESCRIPTION OF PREFERRED EMBODIMENTS

EMBODIMENT 1

Figure 1:
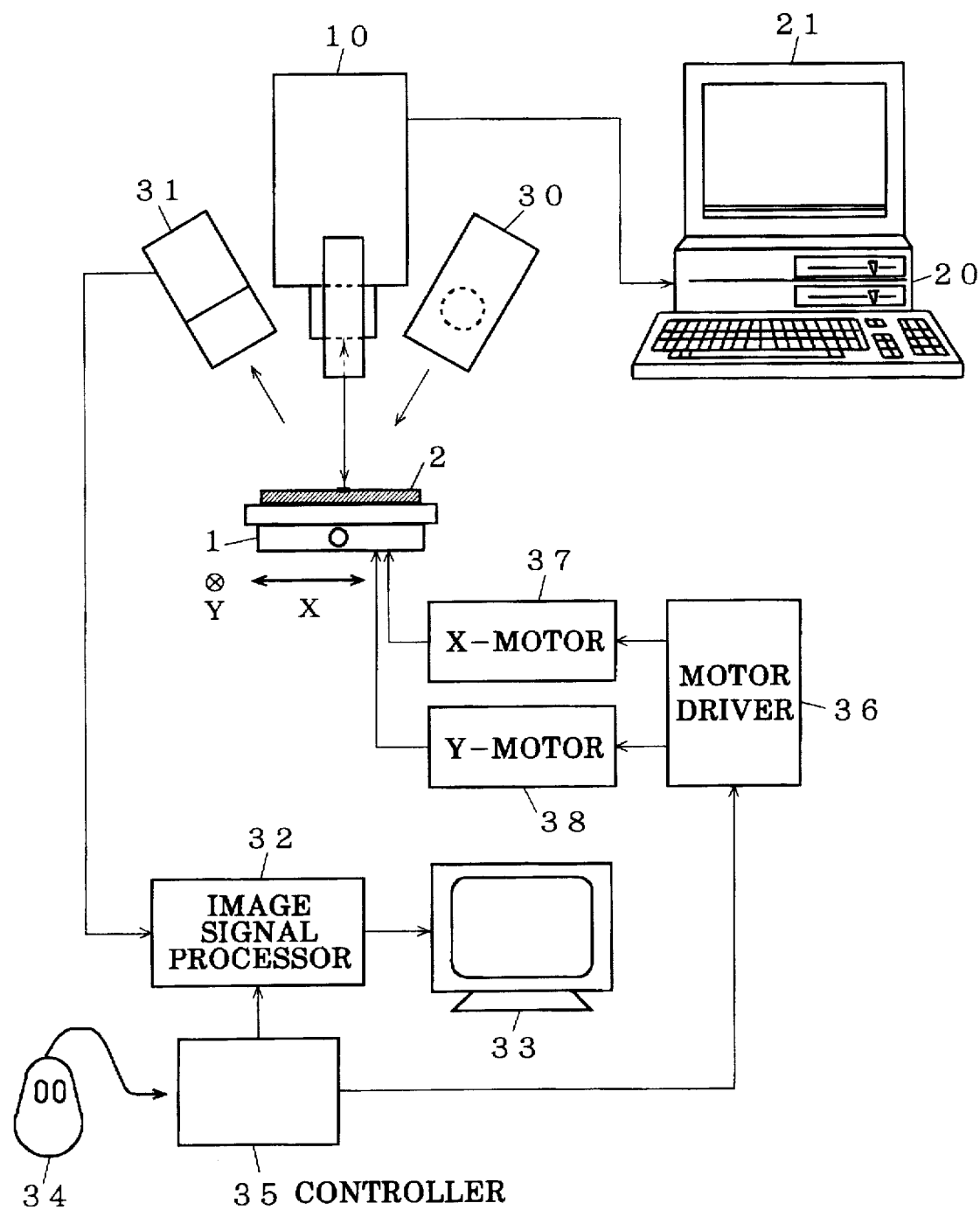
FIG. 1 is a schematic diagram of a colorimeter of EMBODIMENT 1.
Figure 9:
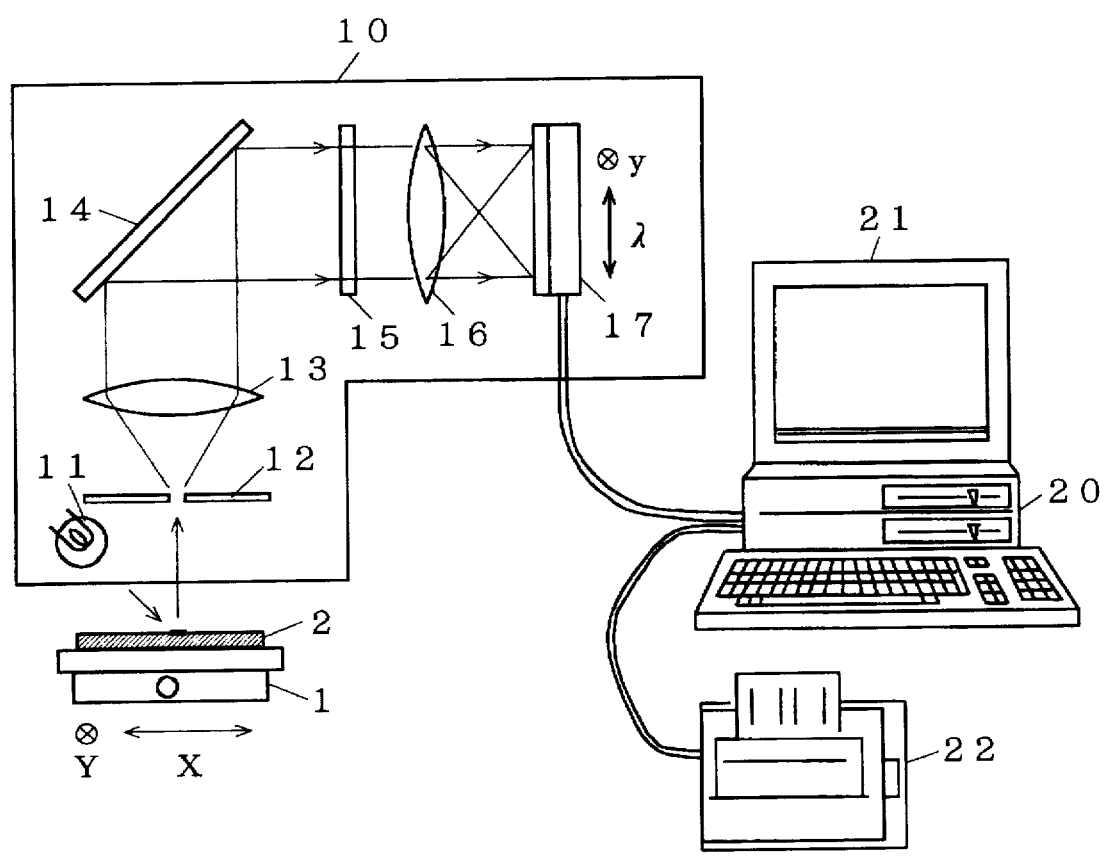
FIG. 9 is a schematic diagram of a conventional colorimeter.

FIG. 1 shows an abstract structure of a colorimeter embodying the first type of the present invention, in which the optical system 10 is the same as shown in FIG. 9. A lamp 30 provided for a sample picturing illuminates the sample 2 at an oblique angle, and a CCD camera 31 takes a picture of the whole or a part of the sample 2. The image signal of the sample picture is sent to an image signal processor 32 where the signal is converted to a set of image data and stored in a frame memory provided in it. Various image processing may be made on the image data of the sample picture in the image signal processor 32, such as noise filtering, edge emphasis, color correction, etc. An image superimposing is also performed here to make a window display as described later. The image data processed in the image signal processor 32 is sent to a display device 33 where the picture of the sample surface is shown on the screen of the display device 33.

When a mouse 34 is operated, a signal corresponding to the operation is sent to a controller 35. The controller 35, which is composed of a CPU, ROM, RAM, etc., processes the signal, and generates and sends control signals to the image signal processor 32 and a motor driver 36 according to the operation of the mouse 34, as described later. Responsive to the control signals, the motor driver 36 drives an X-axis motor 37 and Y-axis motor 38 to move a sample stage 1, whereas the designated place of the sample is measured.

A process of a color measurement on the above colorimeter is now described. First a sample 2 is put on the sample stage 1, and the operator adjusts the zoom lens (not shown) of the CCD camera 31 to show the picture of the whole sample 2 on the screen of the display device 33. When the object of the measurement is a part of the sample surface, the zoom lens is adjusted to show the part enlarged on the display screen 33. When the zoom lens adjustment of the CCD camera 31 is finished, the operator operates a keyboard (not shown) of the controller 35 to give a command "freeze the picture". When the controller 35 receives the command, it stops storing image data to the frame memory in the image signal processor 32, whereby the picture on the display screen 33 is freezed.

Figure 2A:
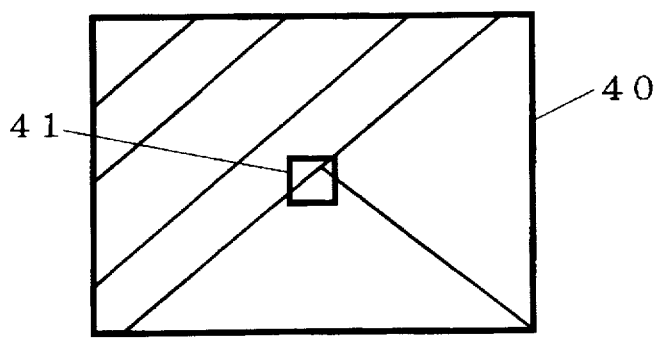
FIGS. 2A and 2B show examples of display on a display screen.

The controller 35, on the other hand, creates image data of a frame including a window. Here the window is a rectangle which will be superimposed on the picture of the sample 2 in the display screen 33. The image data of a frame including the window is sent to the image signal processor 32. In the initial state where the mouse 34 is not yet operated, a window of a preset size is placed at the center of the display screen 33. When the mouse 34 is moved, the window is moved on the display screen 33 accordingly, and when either of two switches on the mouse 34 is depressed, the size of the window is enlarged or shrunk by a preset amount. It is possible to use the mouse 34 according to the standard usage of the Windows Operating System, i.e., to drag the periphery of the window to change the size of the window. The image signal processor 32 superimposes the image data of the frame from the controller 35 on the image data stored in the frame memory, whereby the window 41 is shown superimposed on the picture 40 of the sample 2 in the display screen 33, as shown in FIG. 2A. As described later, the window 41 indicates the area in which a spectrophotometric measurement is performed automatically.

Figure 2B:
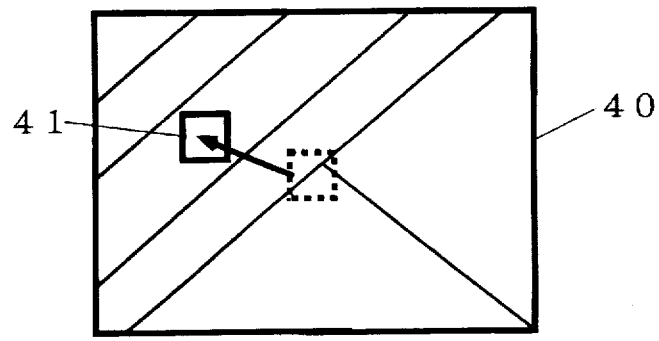

Looking at the picture 40 on the display screen 33, the operator operates the mouse 34. The controller 35 creates the image data of a frame including a window 41 that has the size and location according to the operation of the mouse 34, and sends the image data to the image signal processor 32 at every preset short time interval. Every time the image data comes from the controller 35, the image signal processor 32 superimposes the image data on the image data of the sample picture stored in the frame memory, and refreshes the image on the display screen 33. Thus the picture 40 on the display screen 33 is changed as shown in FIG. 2B where only the size and location of the window 41 are changed while the picture 40 of the sample surface is unchanged.

Meanwhile, based on the information of the position of the zoom lens of the CCD camera 31 at the time the sample picture is freezed and the position of the sample stage 1 at the time the sample picture is freezed, a place in the picture shown on the display screen 33 and an actual place on the sample surface can be correlated. Then, a movement of the sample stage 1 is calculated from the movement of the window 41 on the display screen 33. Thus the controller 35 calculates the X-directional and Y-directional movements of the sample stage 1 based on the signal from the mouse 34, and sends commands to the motor driver 36. Receiving the commands, the motor driver 36 sends driving signals to the X-axis motor 37 and Y-axis motor 38 to move the sample stage 1 according to the movement of the mouse 34. Thus when the mouse 34 is operated, the sample stage 1 moves horizontally to trace the movement of the mouse 34, and the area to be measured comes under the optical system 10.

After locating the window 41 at a desired place in the sample picture 40 on the display screen 33 using the mouse 34, the operator operates the keyboard or the mouse 34 to give a command for starting a spectrophotometric measurement. Receiving the command, the controller 35 starts a spectrophotometric measurement in the selected area of the sample surface corresponding to the window 41. The process of the spectrophotometric measurement is as described before. That is, after a linear portion of the selected area is measured, the sample stage 1 is moved a preset small distance (which is normally set equal to the resolution in the X-direction) by the X-axis motor 37 and the next linear portion neighboring the previous linear portion is measured. After the measurements are repeated and the selected area is swept by the linear portions, the data sent to the personal computer 20 is processed and colors of respective elementary areas are determined. While the spectrophotometric measurement is performed, signals from the mouse 34 are ignored. When the spectrophotometric measurement is completed, signals from the mouse 34 are duly processed.

MODIFICATIONS TO EMBODIMENT 1

When the mouse 34 is moved in the above embodiment, the window 41 moves in the display screen 33 and the sample stage 1 moves according to the movement of the mouse 34 while the sample picture 40 on the display screen 33 is freezed. A modification to such method is that the location of the window 41 is fixed at the center of the display screen 33 and the sample picture is not freezed. In this case, when the mouse 34 is moved, the sample stage 1 is moved accordingly while the CCD camera 31 takes the picture of the fixed place under the optical system 10. Thus the sample picture moves according to the movement of the mouse 34 while the window 41 is fixed at the center of the display screen 33 showing the measurement area.

Another modification is that the sample stage 1 is not moved when the mouse 34 is moved and the window 41 in the display screen 33 moves accordingly. After moving the window 41 to a desired place on the sample picture using the mouse 34, the operator depresses a switch on the mouse 34 or clicks on an appropriate command area in the display screen 33 to give a command of "move sample stage". Receiving the command, the controller 35 calculates the direction and amount of movement of the sample stage 1 referring to the location of the window in the display screen 33, and sends commands to the motor driver 36 to move the sample stage 1 as calculated, whereby the place to be measured corresponding to the window 41 comes under the optical system 10.

In this case, further, it is possible to refresh the image data in the frame memory by the image data of the picture taken by the CCD camera 31 when the movement of the sample stage 1 is finished and the desired place on the sample 2 is located under the optical system 10, and superimpose the image data of a frame including the window 41 located at the center. This method is convenient for the operator when the sample 2 is large and the area taken by the CCD camera 31 is rather small.

EMBODIMENT 2

Figure 3:
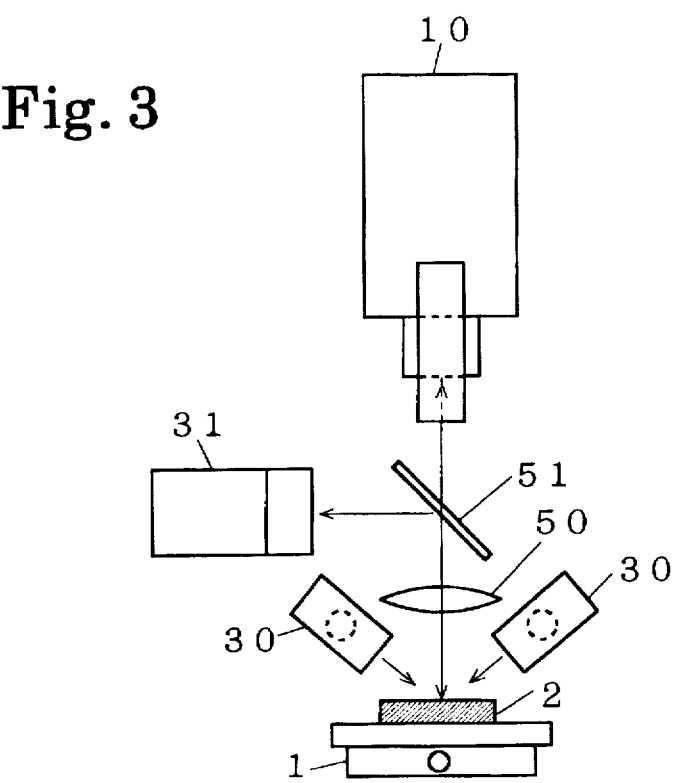
FIG. 3 is a schematic diagram of the optical system of EMBODIMENT 2.

The camera 31 is placed at an oblique angle from the normal to the sample surface in the preceding embodiment, which renders a distorted picture of the sample surface. Such a distortion may not be harmful in locating the window at a desired place but gives a rather odd feeling to the operator. It is therefore preferable to correct the distortion especially when the picture is printed out. The spectrophotometer of the present embodiment as shown in FIG. 3 does not render such a distortion. A lens 50 and a half-mirror 51 are provided between the sample 2 and the optical system 10 to give half of the light from the sample surface to the camera 31 and the rest half to the optical system 10. An alternative is that a full-reflection mirror is placed on the optical path to take the picture of the sample surface, and the full-reflection mirror is displaced from the optical path after the picture is freezed on the display screen 33.

EMBODIMENT 3

Figure 4:
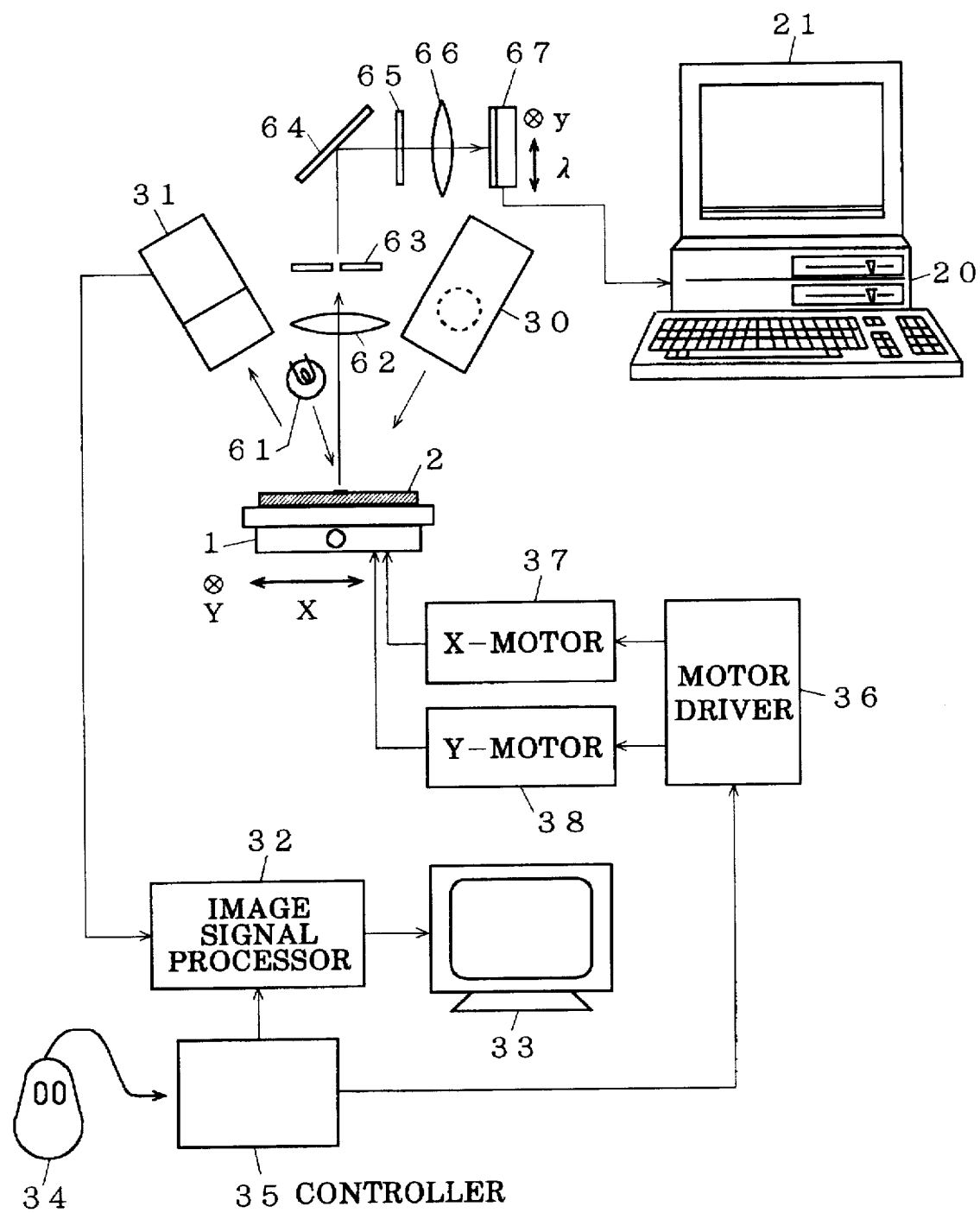
FIG. 4 is a schematic diagram of a colorimeter of EMBODIMENT 3.

FIG. 4 shows a colorimeter embodying the second type of the present invention. The optical system of the colorimeter includes a lamp 61, an object lens 62, a pinhole plate 63, a diffraction grating 64, a harmonics-eliminating filter 65, another lens 66 and a photo-detector 67. The lamp 61 casts a spot light of an adequate diameter onto the sample 2, and the light reflected from the sample surface is focused by the object lens 62 on the pinhole plate 63 to form an image of the sample surface. The light of a portion (the measurement spot) of the image passes through the pinhole in the pinhole plate 63, and the light is separated with respect to the wavelength by the diffraction grating 64. Harmonics in the separated light are eliminated by the harmonics-eliminating filter 65. The separated light is cast by the lens 66 onto the photo-detector 67 which is composed of a plurality of elementary photo-sensors aligned linearly, whereby the spectrum of the measurement spot is obtained. The data of the spectrum is sent to a personal computer 20 where the data is analyzed and the result is shown on the screen of a display device 21.

Similarly to EMBODIMENT 1, the sample stage 1 is moved in the X- and Y- directions according to the operation of the mouse 34. Instead of the window used in EMBODIMENT 1, a "+" cursor or an arrow is used to show the measurement spot on the sample picture shown on the display screen 33.

The colorimeter of the present embodiment is convenient when color measurements at spots of rather small number are required to perform at high speed. It is also advantageous in that the S/N ratio of the measurement is improved. One reason is that the intensity of light cast onto the sample 2 is high because the light from the lamp 61 is concentrated in a narrow spotted area. Another reason is that an optical system having a larger numerical aperture can be used because less aberrations of the optical system are expected in collimating a spot area toward the diffraction grating 64 than in collimating a linear area. Thus more light is collected by the optical system to produce a spectrum.

EMBODIMENT 4

Figure 5:
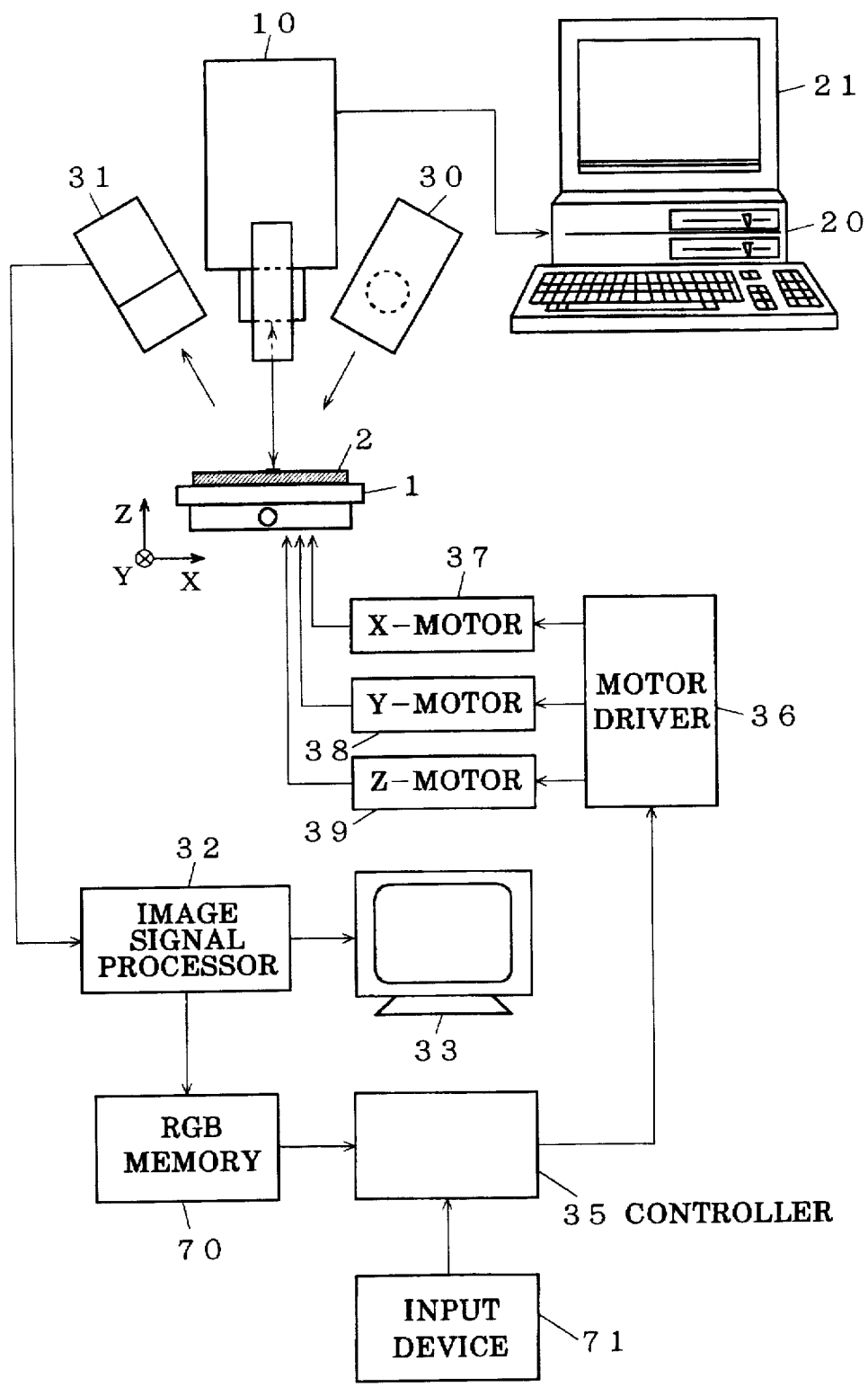
FIG. 5 is a schematic diagram of a colorimeter of EMBODIMENT 4.

FIG. 5 shows a colorimeter embodying the third type of the present invention. The optical system 10 of the colorimeter of the present embodiment is the same as in EMBODIMENT 1. A lamp 30 provided for a sample picturing illuminates the sample 2 at an oblique angle, and a color CCD camera 31 takes a picture of the whole or a part of the sample 2. The color image signal of the sample picture is sent to an image signal processor 32 where various image processings are made on the image data of the sample picture in the image signal processor 32, such as noise filtering, edge emphasis, color correction, etc, and the picture is shown on the display screen 33. The color image signal of a frame from the CCD camera 31 is converted into a set of color image data composed of R (red), G (green) and B (blue) depth data of respective pixels constituting the frame, and the color image data are stored in an RGB memory 70. A controller 35, which is composed of a CPU, ROM, RAM, etc., can read out the data of any pixel of any color stored in the RGB memory 70 by designating the proper address.

According to an instruction from the operator as described later, the controller 35 reads out an appropriate data from the RGB memory 70 and examines the data. Based on the examination result, the controller 35 generates commands and sends them to a motor driver 36. The sample stage 1 is movable three-dimensionally by an X-axis motor 37, Y-axis motor 38 and Z-axis motor 39, among which X-axis motor 37 and Y-axis motor 38 are for locating a desired place of the sample 2 under the optical system 10, and the Z-axis motor 39 is for setting the measurement area at a desired size. A command input device 71 such as a keyboard or mouse is connected to the controller 35. The command input device 71 to the controller 35 may be commonly used with that of the personal computer 20, and the display device 33 may also be used commonly with that 21 for the personal computer 20.

When colors of a sample 2 is measured, the operator puts the sample 2 on the sample stage 1, and adjusts the zoom lens of the CCD camera 31 to show the whole of the sample 2 on the display screen 33. When a part of the sample is measured, the zoom lens is adjusted to show the part enlarged on the display screen 33. After the zoom lens of the CCD camera 31 is adjusted, the operator operates the command input device 71 of the controller 35 to give a command "memory the data". When the controller 35 receives the command, it stores the color image data of the frame of the sample picture at that time in the RGB memory 70.

Figure 6:
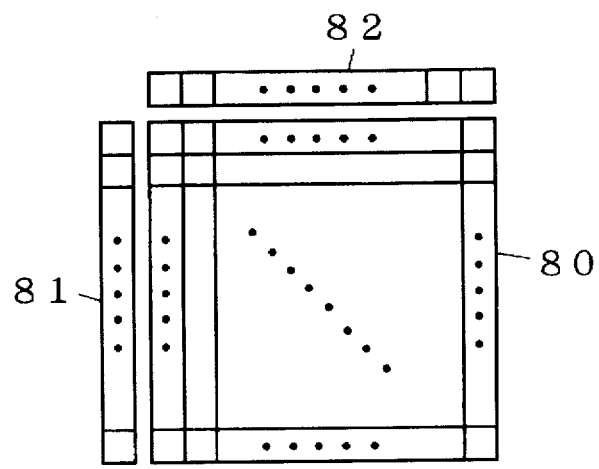
FIG. 6 shows a logical structure of the memory space in an RGB memory of EMBODIMENT 4.

For measuring a desired place within the sample picture shown on the display screen 33, the relation between the actual place on the sample surface and the address of each pixel in the frame should be known beforehand. This is done as follows. FIG. 6 shows a logical structure of the memory space in the RGB memory 70. The RGB memory 70 includes a main memory 80, an X-axis memory 81 and a Y-axis memory 82. The main memory 80 consists of memory cells having a two-dimensional structure corresponding to the frame of the CCD camera 31, where each memory cell stores the color data of a pixel. Each memory cell of the main memory 80 has the memory capacity corresponding to the depth of the three primary colors, RGB. The X-axis memory 81 consists of memory cells having a linear structure corresponding to the X-coordinate of the main memory 80, and Y-axis memory 82 consists of memory cells having a linear structure corresponding to the Y-coordinate of the main memory 80.

The color data of a frame is stored in the main memory 80. Since the CCD camera 31 is fixed, the scope of the area on the sample 2 taken by the CCD camera 31 is determined if the position of the sample stage 1 (i.e., X-axis position and Y-axis position) and the position of the zoom lens are determined, whereby the X- and Y-coordinates of any place on the sample surface are determined. When, for example, the unit of coordinates is set equal to the minimum resolution of the spectrophotometric measurement, and if the minimum resolution of the spectrophotometric measurement is equal to the size of a pixel of the CCD camera 31, an address within the main memory 80 corresponds to the unit of coordinates in the scope of the area taken by the CCD camera 31. Thus the coordinate values are stored in the X-axis memory 81 and the Y-axis memory 82, whereby any coordinate values of the X-axis and Y-axis are directly obtained by reading out the data from the X-axis memory 81 and the Y-axis memory 82.

Figure 7:
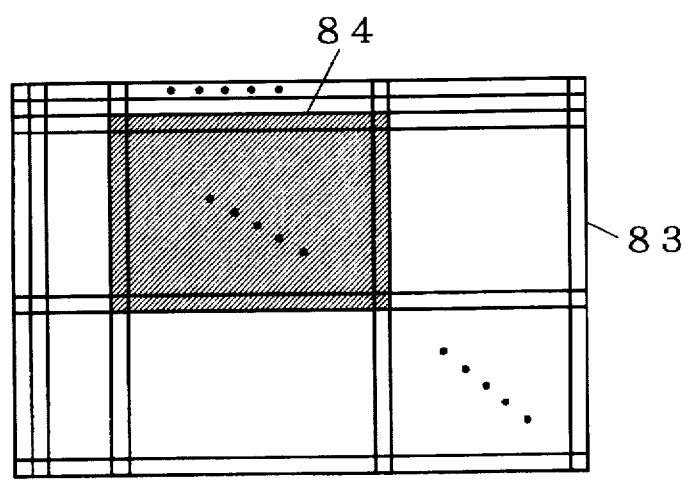
FIG. 7 shows a logical structure of the memory space in an RGB memory of a variation of EMBODIMENT 4.

Another method of determining the relationship between the address in the RGB memory 70 and the actual place on the sample surface is as follows. As shown in FIG. 7, a large memory space 83 is provided to cover the whole range of area that the sample stage 1 can reach. Within the large memory space 83, each memory cell corresponds to an actual elementary area in the whole range of area, and data of a pixel taken by the CCD camera 31 is directly stored in the corresponding memory cell of the large memory space 83. Thus the image data taken by the CCD camera 31 occupies a block 84 in the large memory space 83 as shown in FIG. 7. When the zoom lens of the CCD camera 31 is adjusted to take a very small area on the sample surface, the image data occupies a very small block 84 in the large memory space 83.

Using the color image data stored in the RGB memory 70, various automatic measurement can be performed. An example is as follows. When some areas having similar colors have to be precisely compared in a sample 2 composed of many complicated areas of different colors, the colorimeter of the present embodiment can automatically choose said some areas, determine the colors and compare them. In this measurement, first the color to be compared is set by the operator from the command input device 71, where the color may be designated by the color number or by choosing one from a plurality of color samples. When the color is set, the controller 35 reads out data from cell to cell in the RGB memory 70 and examines whether the color of the data is the same or similar to the set color. When data of all the cells are examined, the area of the same or similar colors are chosen.

Figure 8:
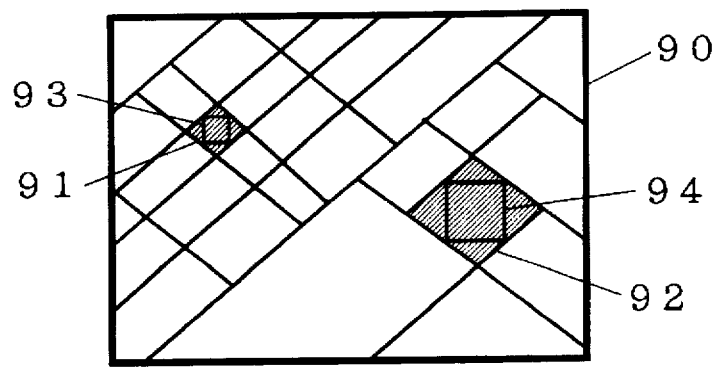
FIG. 8 is shows an example of display on a display screen in EMBODIMENT 4.

In a frame 90 as shown in FIG. 8, for example, the hatched areas 91 and 92 can be regarded having the same or similar colors, and a measurement area should be set within each of the areas 91 and 92. In this case, the areas 91 and 92 can be automatically selected as described above. After the areas 91 and 92 are thus selected, a rectangular window 93 or 94 for showing the measurement area is set in each of the selected areas 91 and 92, and the coordinates of the windows 93 and 94 are determined. Based on the coordinates, the amount of movement of the sample stage 1 in the X- and Y-directions for bringing the window 93 or 94 under the optical system 10 is then calculated, and the amount of movement of the sample stage 1 in the Z-direction is also calculated for equalizing the measurement area to the size of the window 93 or 94. The controller 35 sends commands representing the X-, Y- and Z-directional movements to the motor driver 36, which controls respective motors 37, 38 and 39 to bring the starting line (a Y-directional linear portion of one of the windows 93, for example) under the optical system 10. Then the linear portion of the window 93 is measured, and a spectral image of the linear portion is obtained, where one dimension of the spectral image corresponds to the Y-directional position of the linear portion and the other dimension corresponds to the spectrum of each point of the linear portion.

After the measurement of the starting linear portion is finished, the sample stage 1 is moved by the X-axis motor 37 in the X-direction to the neighboring linear portion and the same measurement as above is done. When the measurements on the Y-directional linear portions are thus repeated and the window 93 is swept by the linear portions, the spectra of each point in the window 93 (i.e., the two-dimensional measurement area) are obtained. Then the motor driver 36 drives the X-, Y- and Z-axis motors 37, 38 and 39 to bring the starting line of the next window 94 under the optical system 10. When all such measurements are finished for the selected windows 93 and 94, the colors of the areas 91 and 92 are determined.

Using the above method of detecting areas having the same or similar colors, the following measurements become possible:

(1) calculate an average color value of areas having the same or similar colors; and (2) color measurements on areas having the same or similar colors are omitted and only areas having different colors are measured.

Though a two-dimensional area is measure in the above description, similar measurement on a small spot area on the sample 2 is also possible. Since, in this case, the size of the spot can be varied by moving the sample stage 1 in the Z-direction, such measurements become possible that an average color of a rather broad spot area is measured, or a color of a narrow spot area of a precise position is measured. Further, a measurement of an area having a complicated shape can also be performed by placing a mask plate having an aperture of such shape between the sample 2 and the optical system 10.

In any of the preceding embodiments, the optical system 10 may be moved instead of moving the sample stage 1.

What is claimed is:

1. A spectrophotometer comprising:

a light source for casting a light on a sample;

a spectral element for separating the light coming from a linear portion of the sample with respect to wavelength;

a photo-detector including a plurality of elementary photo-sensors arrayed two-dimensionally for measuring the light separated by the spectral element;

a first controller for controlling a relative movement of a sample stage on which the sample is mounted and an optical system including the spectral element and the photo-detector in order to perform a spectrophotometric measurement;

a camera for taking a picture of the sample;

a display device for showing the picture of the sample;

an input device used by an operator looking at the picture for designating a photo on the sample;

a second controller for controlling a relative movement of the sample stage and the optical system in order to bring the designated place at the optical system;

a window generator for generating an image of a window at the designated place; and a superimposer for superimposing the image of the window on the picture of the sample.

2. The spectrophotometer according to claim 1, wherein a half mirror is placed between the sample and the optical system for splitting the light from the sample to the optical system and to the camera.

3. The spectrophotometer according to claim 1, wherein a movable mirror is provided, the mirror being movable between a first position on an optical path between the sample and the optical system for reflecting the light from the sample to the camera and a second position out of the optical path for letting the light from the sample toward the optical system.

4. A colorimeter using the spectrophotometer according to claim 1.

5. A spectrophotometer comprising:

a light source for casting a light on a sample;

a spectral element for separating the light coming from the sample with respect to wavelength;

a photo-detector for measuring the light separated by the spectral element;

a camera for taking a picture of the sample;

a display device for showing the picture of the sample;

an input device used by an operator looking at the picture for designating a place on the sample;

a controller for controlling a relative movement of a sample stage and an optical system including the spectral element and the photo-detector in order to bring the designated place at the optical system;

a pointer generator for generating an image of a pointer at the designated place; and a superimposer for superimposing the image of the pointer on the picture of the sample.

6. The spectrophotometer according to claim 5, wherein a half mirror is placed between the sample and the optical system for splitting the light from the sample to the optical system and to the camera.

7. The spectrophotometer according to claim 5, wherein a movable mirror is provided, the mirror being movable between a first position on an optical path between the sample and the optical system for reflecting the light from the sample to the camera and a second position out of the optical path for letting the light from the sample toward the optical system.

8. A colorimeter using the spectrophotometer according to claim 5.

9. A colorimeter for measuring a color or colors of a sample mounted on a sample stage by performing a spectrophotometric measurement of the sample using an optical system, the colorimeter comprising:

a camera for taking a color picture of the sample, the picture consisting of two-dimensionally arrayed pixels;

a data storage for storing color data of the pixels with an information about a place of each of the pixels;

determining means for determining a place and/or a size of a measurement area of the sample based on the color data of the pixels with the information about the place referring to a preset rule;

moving means for moving the sample stage and/or the optical system; and a controller for controlling a relative movement of the sample stage and the optical system so that the spectrophotometric measurement is performed on the measurement area.

10. The colorimeter according to claim 9, wherein the colorimeter further comprises:

a pointer generator for generating an image of a pointer at the designated place; and a superimposer for superimposing the image of the pointer on the picture of the sample.

11. The colorimeter according to claim 9, wherein a half mirror is placed between the sample and the optical system for splitting the light from the sample to the optical system and to the camera.

12. The colormeter according to claim 9, wherein a movable mirror is provided, the mirror being movable between a first position on an optical path between the sample and the optical system for reflecting the light from the sample to the camera and a second position out of the optical path for letting the light from the sample toward the optical system.

* * * * *